United States Patent [19]
Wach

[11] Patent Number: 5,764,840
[45] Date of Patent: Jun. 9, 1998

[54] OPTICAL FIBER WITH ENHANCED LIGHT COLLECTION AND ILLUMINATION AND HAVING HIGHLY CONTROLLED EMISSION AND ACCEPTANCE PATTERNS

[75] Inventor: Michael Leonard Wach, Byron, Ga.

[73] Assignee: Visionex, Inc., Warner Robins, Ga.

[21] Appl. No.: 561,484

[22] Filed: Nov. 20, 1995

[51] Int. Cl.[6] ........................................ G02B 6/02
[52] U.S. Cl. .............................. 385/123; 385/85; 385/78; 385/124
[58] Field of Search ........................ 385/123, 85, 78, 385/75, 76, 77, 86, 901, 124–132

[56] References Cited

U.S. PATENT DOCUMENTS

| | | | |
|---|---|---|---|
| 3,796,905 | 3/1974 | Tomii et al. | 313/92 |
| 3,874,783 | 4/1975 | Cole | 350/96 B |
| 3,910,677 | 10/1975 | Becker et al. | 350/96 C |
| 4,191,446 | 3/1980 | Arditty et al. | 350/96.15 |
| 4,380,365 | 4/1983 | Gross | 350/96.18 |
| 4,449,535 | 5/1984 | Renault | 128/634 |
| 4,573,761 | 3/1986 | McLachlan et al. | 350/96.24 |
| 4,654,532 | 3/1987 | Hirschfeld | 250/458.1 |
| 4,707,134 | 11/1987 | McLachlan et al. | 356/342 |
| 4,812,003 | 3/1989 | Dambach et al. | 350/96.18 |
| 4,816,670 | 3/1989 | Kitamura et al. | 250/227 |
| 4,979,797 | 12/1990 | Nemeth | 350/96.29 |
| 4,995,691 | 2/1991 | Purcell, Jr. | 350/96.15 |
| 5,011,254 | 4/1991 | Edwards et al. | 350/96.18 |
| 5,011,279 | 4/1991 | Auwater et al. | 356/28.5 |
| 5,037,180 | 8/1991 | Stone | 385/123 |
| 5,074,632 | 12/1991 | Potter | 385/31 |
| 5,146,917 | 9/1992 | Wagnieres et al. | 128/397 |
| 5,166,756 | 11/1992 | McGee et al. | 356/446 |
| 5,196,005 | 3/1993 | Doiron et al. | 606/7 |
| 5,253,312 | 10/1993 | Payne et al. | 385/31 |
| 5,263,952 | 11/1993 | Grace et al. | 606/15 |
| 5,269,777 | 12/1993 | Doiron et al. | 606/7 |
| 5,330,465 | 7/1994 | Doiron et al. | 606/7 |
| 5,402,508 | 3/1995 | O'Rourke et al. | 385/31 |
| 5,421,928 | 6/1995 | Knecht et al. | 156/153 |
| 5,432,880 | 7/1995 | Diner | 385/85 |

OTHER PUBLICATIONS

Righini, Giancarlo C., et al. "Microlens—Ended Fibers: A New Fabrication Technique." Istituto di Ricerca sulle Onde Elettromagnetiche, Firenze, Italy, pp. 21–27. No Month, No Date.

Ku, R.T. "Progress in Efficient/Reliable Semiconductor Laser–to–Single–Mode Fiber Coupler Development," pp. 4–6 1984. No Month.

Nagase, Ryo, et al. "Connection Mechanism of Physical–Contact Optical Fiber Connectors with Spherical Convex Polished Ends," *Applied Optics*, vol. 30, No. 36, pp. 5260–5265, 1991. No Month.

Nagase, Ryo, et al. "Highly Stable Physical–Contact Optical Fiber Connectors with Spherical Convex Ends." *Journal of Ligthwave Technology*, vol. 11, No. 2, pp. 241–248, 1993. No Month.

Kanda, Torahiko. "A New Spherical Mirror–Finish Surface Machining Technology for Optical Fiber Connector," *NEC Res. & Develop.*, vol. 36, No. 2, pp. 271–279 1995. No Month.

Margheri, G. and Russo V. "Lens Ended Fiber–Fiber Connections for Power Laser Applications," *SPIE*, vol. 701 ECOOSA, pp. 220–225, 1986. No Month.

*Primary Examiner*—Phan T.H. Palmer
*Attorney, Agent, or Firm*—Jones & Askew, LLP

[57] ABSTRACT

An optical fiber, including a cylindrical core of light conducting material having a first refractive index, surrounded by a cladding having a second refractive index that is lower than the first refractive index. The optical fiber includes at least one endface formed with a cone tip for controlling the characteristics of light entering or exiting the fiber. The polish angle of the cone tip can be selected according to the desired emergence/acceptance properties of the fiber.

31 Claims, 3 Drawing Sheets

OPTICAL FIBER WITH ENHANCED LIGHT COLLECTION AND ILLUMINATION AND HAVING HIGHLY CONTROLLED EMISSION AND ACCEPTANCE PATTERNS

TECHNICAL FIELD

This invention relates generally to optical fibers, and more particularly to optical fibers having at least one endface provided with a cone tip for controlling the pattern and characteristics of light entering or exiting the fiber.

BACKGROUND OF THE INVENTION

In recent years, the use of optical fibers has become increasingly widespread in a variety of applications. For example, high capacity optical fibers are rapidly replacing traditional telephone and coaxial cable lines to transmit voice and video signals across the country. Fiber optic sensors and probes are also commonly used by physicians and researchers for such things as the treatment of cancer and for spectral analysis of samples.

The term "optical fiber" is used herein to refer generally to any optical waveguide or structure having the ability to transmit the flow of radiant energy along a path parallel to its axis and to contain the energy within or adjacent to its surface. The optical fiber category includes both "step index" and "gradient index" fibers. The term "multimode" optical fiber refers to an optical waveguide that will allow more than one bound mode to propagate. This property is typically achieved in fibers whose core diameter is relatively large (typically at least equaling about 10 microns) compared with the wavelength of the luminous radiation carried by the fiber. In contrast, "single mode" optical fibers have a core diameter on the order of magnitude of the wavelength, generally only a few microns.

In the general sense, numerical aperture (NA) refers to the vertex angle of the largest cone of meridional rays that can enter or leave an optical system or element, multiplied by the refractive index of the medium in which the vertex of the cone is located. In the context of fiber optics, numerical aperture is used to refer to the light acceptance or emergence characteristics and is a measure of light gathering ability. Numerical aperture value is often used to characterize bare, unterminated fiber, and in this context, it specifies the characteristics of the fiber with the ends polished flat. Thus, numerical aperture for conventional optical fibers has often been defined as:

$$NA = n_2 \sin\theta_e$$

where $n_2$ is the refractive index of the medium (typically air) through which the light is initially propagated so as to be incident upon an input end of the fiber, and $\theta_e$ is one half the included acceptance angle (or, conversely, the emergence angle) at the input end of that fiber. The "acceptance angle" of a fiber refers to the angles within which the input end of the fiber will accept a cone of light and undergo total internal reflection, while the "emergence angle" corresponds to the illumination pattern of light that it emitted from the output end of the fully filled fiber. Thus, an acceptance angle of $\theta_e$ indicates that the fiber will accept a cone of light within $\pm\theta_e$. The greater the acceptance angle, the larger the light gathering ability of the optical fiber. Similarly, the fully filled fiber will have an illumination pattern defined by these angular limitations.

Numerical aperture may also be defined as a function of the physical (optical) properties of the fiber's materials of construction:

$$NA = \sqrt{n_o^2 - n_1^2}$$

where $n_0$ is the refractive index of the fiber core, and $n_1$ is the refractive index of the cladding (the medium cylindrically encircling the core). Thus, conventional flat-faced optical fibers have numerical apertures which are primarily a function of the refractive indices of the core, cladding and media surrounding the endface.

Depending on the particular application, it may be preferable to have an optical fiber with larger or smaller angles of acceptance and emergence. For example, in certain sensing applications, it may be desirable to use an optical fiber with a relatively large acceptance angle so that the fiber will collect light more efficiently from the sample being measured. Similarly, when an optical fiber is used for illumination or indicating purposes, it is often advantageous for the light to emerge from the optical fiber with a large illumination pattern so that the light will be visible from wide viewing angles.

On the other hand, for many other applications, it may be desirable to minimize the acceptance and emergence angle of the optical fiber. For example, a fiber optic probe commonly includes at least one transmitting optical fiber that emits light into a sample to be measured and at least one adjacent receiving optical fiber that receives light reflected from the sample. By measuring the light scattered by the sample and comparing it to the source light, certain characteristics of the sample can be determined. In these cases, it is undesirable for light to pass from the transmitting fiber directly to the receiving fiber without first interacting with the sample to be measured. This criterion is difficult to meet when the fibers are positioned behind a window. To minimize this effect, it may be preferable for the transmitting fiber to have a specialized emergence pattern which projects its energy through the window and outward into the sample before rapidly diverging, and likewise for the receiving fiber.

Traditionally, the pattern and characteristics of light entering or exiting the fiber was controlled by selecting a combination of core, cladding and surrounding media such that the numerical aperture or acceptance/emergence angles were suitable for the specific application. However, there are significant physical limitations with this method that affect the ability to adjust the numerical aperture of those optical fibers. As a result, conventional flat-faced optical fibers have a relatively narrow acceptance angle, so that these fibers have poor light gathering characteristics and can often collect only a small fraction of the available light. This is particularly problematic in the case where the light beam is incident on the fiber face from extreme and highly diverse angles as the optical fiber can only accept those light rays that arrive at an angle less than or equal to its acceptance angle.

A variety of different solutions have been proposed in attempting to improve the light gathering ability of flat-faced optical fibers. Many proposals utilize discrete optical elements in front of the fiber face, such as lenses, prisms, mirrors, etc. in order to enlarge the acceptance angle of the optical fiber. However, this adds significantly to the complexity and the cost of the device, and the resulting fiber assembly is bulky and not mechanically robust. The optical elements are also inherently prone to misalignment, shifting, stresses, shock, cracks, scratches, etc.

In attempts to improve upon the displacement sensitivity in laser diode source-to-fiber coupling of conventional flat-faced optical fibers, the fiber faces of some single mode fibers have been formed into various shaped surfaces, usually spherically shaped. However, these fibers lack control of light acceptance characteristics, are constrained by the size of the fiber, are limited in their ability to collect light at wide angles, and are not effective at preventing light reflected off the endface from back propagating toward the light source.

Thus, there is a need for an improved optical fiber that provides better control of the pattern and characteristics of light entering or exiting the fiber.

There is also a need for an improved optical fiber that provides better light gathering ability, without the need for expensive and complex optical elements.

SUMMARY OF THE INVENTION

As will be seen, the foregoing invention satisfies the foregoing needs and accomplishes additional objectives. Briefly described, the present invention provides an optical fiber including a cylindrical core surrounded by a cladding layer. The core comprises a light conducting material such as glass, silica, plastic or quartz. The cladding generally comprises a light conducting material with a refractive index that is lower than the refractive index of the core. The cladding may also comprise air or other gas, so long as it has a lower index of refraction than that of the core.

The optical fiber includes at least one endface formed with a cone tip. If the optical fiber is utilized to receive light, the cone tip of the fiber defines an acceptance angle for receiving light incident upon the fiber's endface. Conversely, if the optical fiber is being used for emitting light, the cone tip defines an emergence angle for emitting a cone of light. The acceptance and emergence angles are a function of the polish angle of the cone tip. Therefore, by selecting an appropriate polish angle, the characteristics of the light entering or exiting the optical fiber can be controlled to a greater degree than with conventional flat-faced optical fibers.

The tip of the coned-shaped endface may be positioned along the central longitudinal axis of the optical fiber, or it may be offset from center.

According to another aspect of the present invention, the optical fiber is housed within a transparent window positioned across the cone tip. In this manner, the window forms a chamber between the inside of the window and the cone tip. The window provides protection for the optical fiber by physically shielding the core from any hostile effects from the environment in which the fiber is being used. In addition, the chamber can be filled with air or other gas with a known index of refraction. This allows the behavior of light emerging from the fiber to more accurately predicted and controlled.

DETAILED DESCRIPTION

Figure 1:
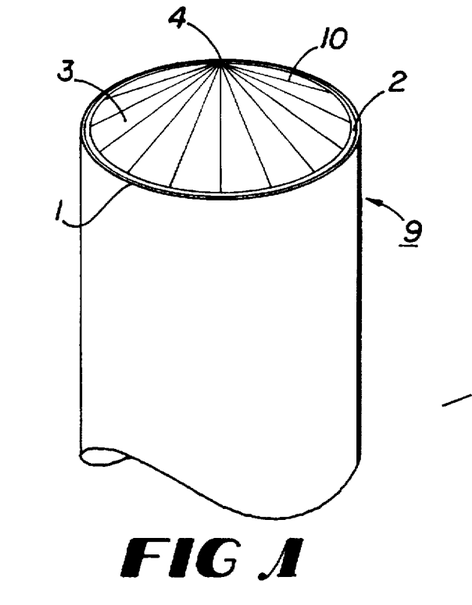
FIG. 1 is a perspective view of an optical fiber with a cone tip according to a preferred embodiment of the present invention.

Referring now to the drawing figures, in which like numerals indicate like elements or steps throughout the several views, the preferred embodiment of the present invention will be described. FIGS. 1–4 depict a step-index, multimode optical fiber 9 constructed in accordance with the present invention. In particular, the optical fiber 9 includes at least one of its endfaces 10 provided with a cone-shaped tip. With the exception of the endface, the optical fiber 9 is of a conventional structure and includes a transparent cylindrical core 3 of a relatively high refractive index, such as glass, silica, plastic, quartz or other light-conducting core material. The core 3 is surrounded by a relatively thin cladding 2 of lower refractive index material which is intimately bonded to core 3. Cladding 2 may be surrounded by an outer coat or buffer 1 to protect the fiber against damage. Although FIG. 1 illustrates an integral cladding layer 2 and an outer buffer 1, those skilled in the art will appreciate that the fiber 9 may also have an unclad core 3 with the surrounding media (often air) having a lower index of refraction than the core.

Figure 6:
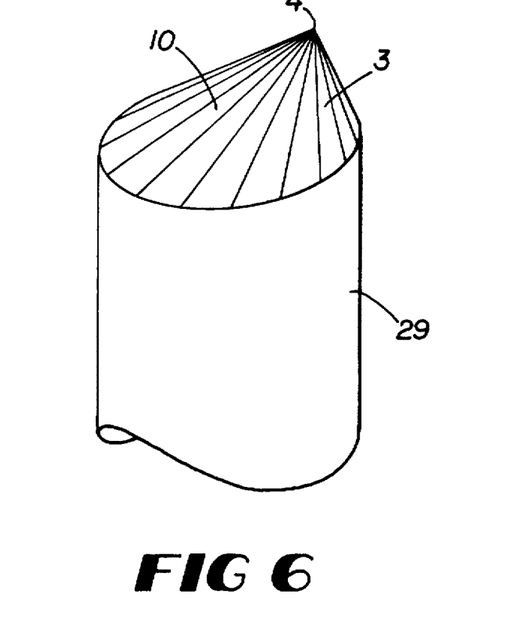
FIG. 6 is a perspective view of an optical fiber with a cone tip having its center offset from the center longitudinal axis of the fiber according to an alternative embodiment of the present invention.

In the preferred embodiment, the tip 4 of the fiber's cone-shaped face 10 is centered in the fiber's core 3. However, the tip 4 may also be offset from the fiber's center longitudinal axis, for example, as shown in FIG. 6.

Still referring to FIGS. 1–4, the optical characteristics and basic design criteria of the optical fiber 9 with a cone tip will be described in detail. For ease of explanation, the following description is based upon a ray analysis rather than a vector analysis or full wave analysis. It will be appreciated that the following analysis does not account for physical effects such as fiber length, physical imperfections and launch conditions. In addition, the near field effects may be significant when the device is utilized in close proximity to additional optical components. These effects are ignored for purposes of this description.

Figure 3:
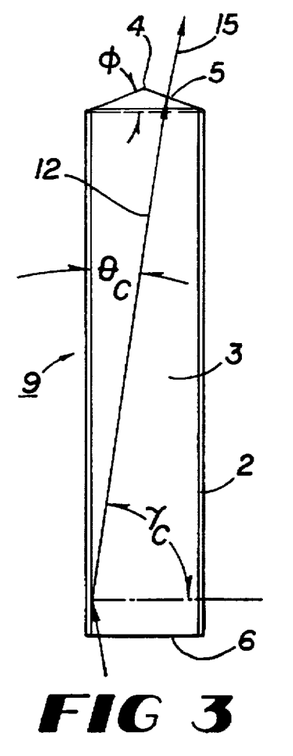
FIG. 3 is a side cross-sectional view of the optical fiber shown in FIG. 1, along the described meridional plane illustrating the path of a meridional ray.
Figure 4:
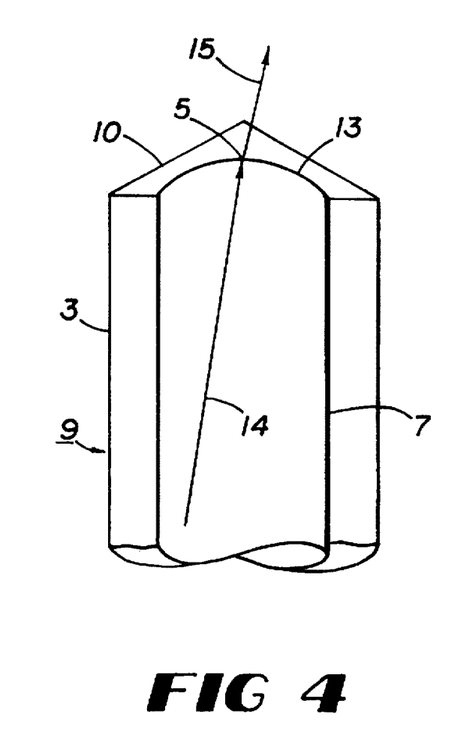
FIG. 4 is a side cross-sectional view of the optical fiber shown in FIG. 1, along the described nonmeridional plane illustrating the path of a nonmeridional skew ray.

Referring to FIGS. 3 and 4, an arbitrary ray 15 exiting the fiber at a point 5 on the cone-shaped fiber face 10 radially offset from the central axis of the fiber's core 3 will be analyzed. The polish angle of the cone face 10 is φ (see FIG. 3). Although this analysis assumes an emerging ray, the system is primarily symmetric with respect to light entering the fiber. Therefore, the results are equally valid for and correlated to light entering or exiting the fiber. Further, even though only a single point on the fiber face is analyzed, the analysis is valid for any and all points on the fiber's face with the exception of the tip 4. For the purposes of this analysis, however, the tip 4 is assumed to be an infinitely small point. Thus although the tip of the physical embodiment has some physical size, it remains negligible for purposes of this analysis.

The emerging ray 15 may be oriented in any direction which the fiber is capable of transmitting via total internal reflection. As is well known in the art, for total internal reflection, the ray's angle of travel within the fiber core 3 must be smaller than the critical angle $\theta_c$ of the fiber. The critical angle $\theta_c$ is defined by the relationship:

$$\sin(90° - \theta_c) = \frac{n_{cladding}}{n_{core}}$$

where n is the refractive index and the angle is referenced to the fiber's longitudinal axis. This relationship defines the angular limits within which the fiber can conduct rays within the fiber core 3. It also dictates the population of angles of light rays within a fiber of sufficient fiber length, launch conditions, fiber stress, etc. to achieve equilibrium modal distribution. The corresponding limits outside the fiber will be discussed below.

Figure 2:
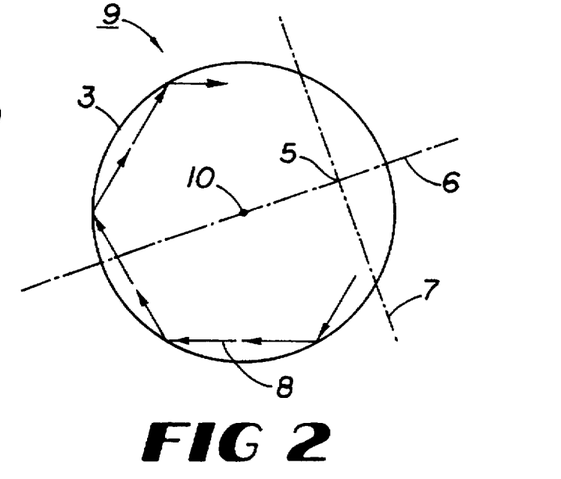
FIG. 2 is an end cross-sectional view of the optical fiber shown in FIG. 1, illustrating meridional and nonmeridional planes and the path of a nonmeridional skew ray.

As shown in FIG. 2, the emerging ray under analysis can be split into two component rays. The first ray 12 (FIG. 3) lies in a meridional plane 6 that intersects the fiber core 3, and which is defined by inclusion of the point of analysis 5 with the fiber's center longitudinal axis containing the tip 4. The second ray 14 (FIG. 4) lies in a second, nonmeridional plane 7 perpendicular to the meridional plane 6, which intersects the point of analysis 5, and is parallel with the fiber's center longitudinal axis.

Because this example assumes that the tip 4 of the cone face is in the center of the endface 10, the fiber is cylindrically symmetrical about the cone's central longitudinal axis. Since all points on the fiber face 10 are radially displaced from the fiber's central axis, the two coordinate planes can be established for any point. The meridional plane 6 containing the point of analysis 5 is established so as to intersect the fiber's center. The nonmeridional plane 7, perpendicular to the meridional plane 6 and also containing the point of analysis 5, is always tangent to a cylindrical surface whose center axis coincides with the fiber's center longitudinal axis and whose radius equals the radial displacement of the analytical point from the fiber's center.

FIG. 3 illustrates the path of the meridional component ray 12, which lies in the meridional plane 6. In the physical implementation, the meridional component ray 12 is typically the strongest of the two component rays and is oriented in the general direction of light travel.

FIG. 4 illustrates the path of the nonmeridional component ray 14, which lies in the nonmeridional plane 7. The nonmeridional component ray 14, also referred to as the skew ray, traces a rotational path 8 around the longitudinal axis of the fiber as the ray traverses the fiber (see FIG. 2).

The nonmeridional plane 7 forms, or sections, a hyperbola 13 as it intersects the surface cone of the fiber's face 10, as shown in FIG. 4. For a given polish angle $\phi$, the shape of the hyperbola 13 is dependent upon the axial displacement of the point of analysis 5 from the fiber's central longitudinal axis. Regardless of this factor, the skew ray 14 exits the fiber face at the vertex of the hyperbola 13. At this point, the hyperbola is flat or has zero slope; and, as the ray 15 exits the fiber, it is refracted accordingly. Since the skew ray 14 lies fully within the plane of analysis and exits the fiber at a point with zero slope within the plane of analysis, it reacts to the surface as if it were flat. In other words, the skew ray 14 remains unaffected by the fiber's cone shape.

For the physical embodiment, the actual density of light traveling in a skew path is determined by factors such as the characteristics of the light source (not shown), launch conditions, length of the optical fiber, and fiber twist. The physical skew ray density may also not be radially uniform in the fiber. For most applications, however, the skew ray component will be minor.

Although the skew rays 14 have been shown to be generally immune to influences of the nonplanar surface of the cone-shaped endface 10 of the fiber, the geometry of the cone tip allows the meridional rays 12 to be precisely manipulated, as will be demonstrated.

As previously described, the angular limits within which the fiber can conduct rays within the fiber core 3 is defined by the equation:

$$\sin(90° - \theta_c) = \frac{n_{cladding}}{n_{core}}$$

Outside the fiber core 3, the corresponding limits are different due to refraction as the rays cross the boundary between fiber and external media. Whether entering or exiting the fiber, the rays are refracted according to Snell's law ($n_2 \sin I_2 = n_3 \sin I_3$) as they cross the boundary between the two media of differing refractive indices, where n represents the refractive index and I represents the angle of ray incidence with respect to the surface normal.

Building on these relationships, an acceptance angle for a conventional flat-faced fiber can be established according to the following equation:

$$n_2 \sin\theta_e = \sqrt{n_{core}^2 - n_{cladding}^2}$$

The term on the left hand side of the equation is often referred to as the numerical aperture of the fiber. The external angle $\theta_e$ corresponds to the critical internal angle $\theta_c$. Thus, a fully filled fiber has an illumination pattern of a cone defined by $\pm\theta_e$. Similarly, the fiber accepts a cone of light within these angular limitations. Rays entering the fiber at angles beyond $\theta_e$ do not undergo total internal reflection at the core/cladding interface within the fiber. These rays are eventually lost through the cladding since each core-to-cladding reflection is less than 100% efficient.

In contrast to a conventional flat-faced optical fiber, the cone-shaped endface of the present invention significantly changes the illumination/acceptance characteristics of the fiber. The cone-shaped tip facilitates efficient acceptance of light and increases light gathering ability. More importantly, the optical characteristics and zones of acceptance, attenuation, and rejection of an optical fiber with a cone tip can be controlled to a greater degree than with conventional flat-faced optical fibers, as will be fully described below in connection with FIG. 5. Likewise, the illumination pattern can be controlled to significant advantage.

Figure 5:
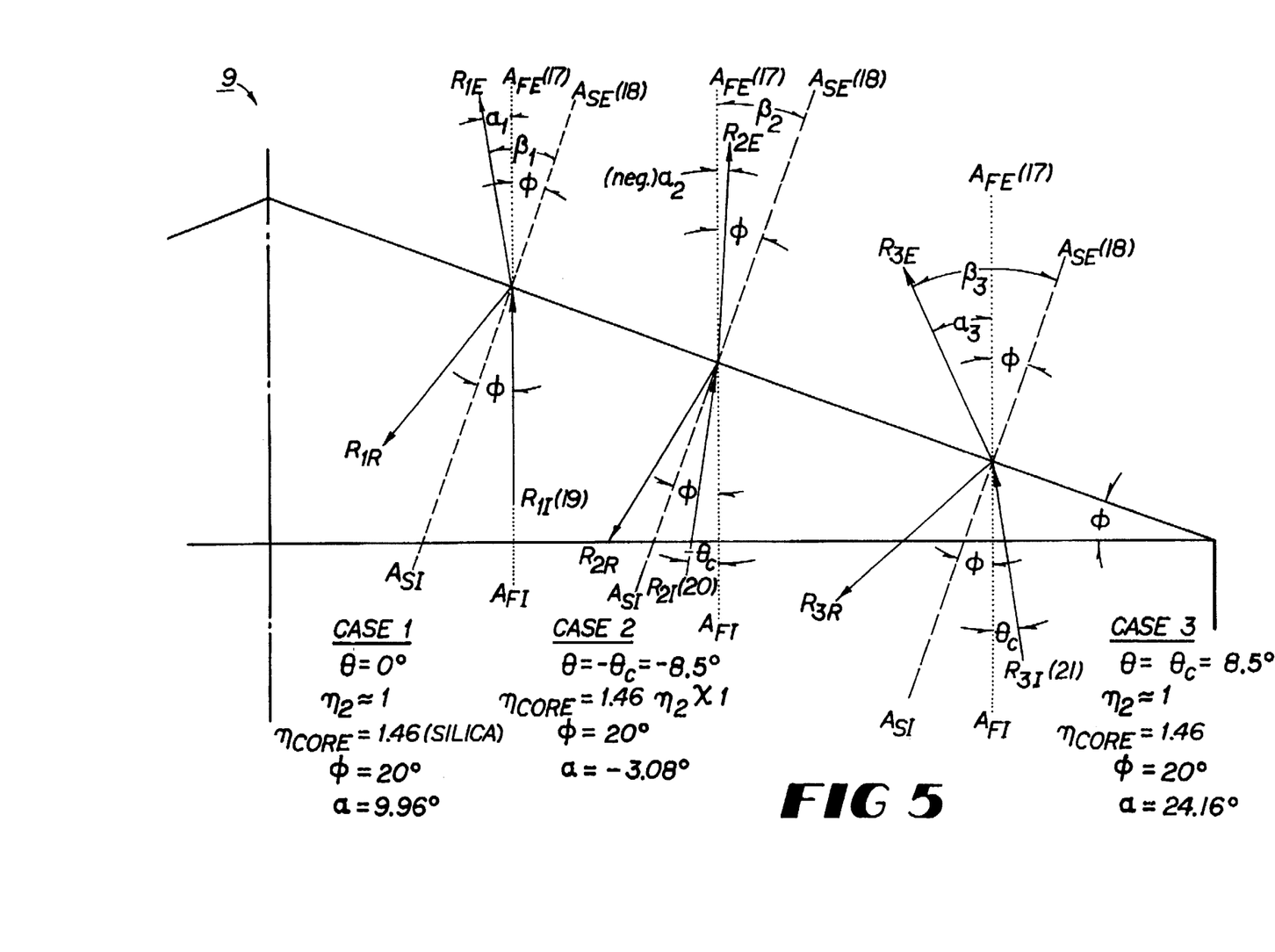
FIG. 5 is a side cross-sectional view of the right side of the triangular conical section of the fiber tip along a meridional plane.

FIG. 5 depicts the right hand side of the triangular conical section of the fiber tip. As previously described, and within the limitations stated, the primary, meridional component of any ray within the core 3 can be analyzed with a corresponding meridional plane 6. Furthermore, the meridional component ray 12 is fully contained within the meridional plane 6. As the meridional plane 6 intersects the cone endface 10, a triangular shape is generated or sectioned. The inclination of the triangle sides remains constant despite the radial offset of the ray from the fiber center. The angles of the triangle are fully defined by, and equal to, the polish angle of the cone of the fiber endface $\phi$.

Due to the cylindrical symmetry of the fiber and the nature of the coordinate planes established, a single analytical point can be studied to fully characterize the optical behavior of the fiber's cone-shaped endface.

In the preferred embodiment, the relationship between the angles of external and meridional rays are governed by the following equation:

$$n_{core} \sin(\theta+\phi) = n_2 \sin(\phi+\alpha)$$

where $\theta$ refers to the angle of the ray with respect to a unit vector ($A_{FI}$) that is parallel to the fiber's longitudinal axis and positioned at the point of analysis; $\phi$ refers to the polish angle of the fiber cone endface; $n_2$ is the refractive index of the surrounding media (air≈1); and a refers to the angle of the refracted ray $R_{nE}$ with respect to the unit vector $A_{FI}$.

As the emerging ray intersects the internal cone surface, an internal reflected ray $R_{nR}$ is also generated. The angle of this ray is defined according to the relationship:

$$\rho = -\theta - 2\phi$$

where $\rho$ is the angle of the internally reflected ray $R_{nR}$ with respect to the unit vector $A_{FI}$. Thus, those skilled in the art will appreciate that it is possible to select the polish angle of the fiber tip $\phi$ to control whether or not the internally reflected ray will be waveguided back towards the light source (not shown).

To illustrate how the cone-shaped surface of the optical fiber can be utilized to control the optical illumination/emergence characteristics of the fiber, the meridional ray shown in FIG. 5 will be described and analyzed in three different cases: maximum positive angle, maximum negative angle and average (zero angle). Characterization of the three cases are undertaken separately. For the purposes of this example, $\theta_c < \phi$, NA=0.22, $n_1 \approx 1$ (air), $n_{cladding}=1.46$ (silica), $\phi=20°$, and $\theta_c=8.5°$. For clarity, the three rays have been displaced to separate, but equivalent, analytical locations.

The first ray R1 19 is incident to the cone-shaped surface parallel to the fiber's longitudinal axis ($\theta=0°$). The second ray R2 20 is directed outward from the fiber's longitudinal axis by the maximum allowable angle $\theta_c(\theta=-\theta_c)$. The third ray R3 21 is directed inward towards the fiber's longitudinal axis by the same angle $\theta_c(\theta=\theta_c)$. The fiber's symmetry allows the results to be applied to the left hand side of the triangle. Furthermore, the results are readily applied to all meridional rays within the fiber.

In a conventional flat-faced fiber, a ray that is parallel to the fiber's longitudinal axis would emerge from the fiber normal to the fiber face. However, in the preferred embodiment, the first ray 19 is directed inward toward the longitudinal axis of the fiber by the cone-shaped fiber face. The amount of refraction is dependent upon the angle of polish $\phi$ and the refractive indices of the core and surrounding media. As long as the core material has a higher refractive index than the surrounding media, the refraction is inward. For steep cone angles (large $\phi$), this ray undergoes total internal reflection at the boundary. Depending on $\phi$, $n_{core}$, $n_1$, and $\theta_c$, this ray may be forced to multiple total internal reflections and redirection with the inner surface of the cone.

In the second example shown in FIG. 5, the second ray 20 continues to diverge away from the longitudinal axis of the fiber as it emerges from the cone shaped fiber face. However, the divergence angle is less than what occurs for a flat-faced fiber. For a properly chosen polish angle $\phi$, the emerging ray may be forced to be parallel to the fiber's axis. ($\alpha=0°$).

In the third example shown in FIG. 5, the third ray 21 is directed inward towards the fiber's longitudinal axis, but at a steeper angle than would occur for a conventional flat-faced fiber. For a properly chosen polish angle $\phi$, the emerging ray may be forced to undergo total internal reflection at the core boundary.

Thus, it will be appreciated that the optical fiber constructed in accordance with present invention allows for improved control of the illumination/emergence characteristics than conventional flat-faced optical fibers. For example, the endface of a source fiber can be shaped in such a manner to prevent energy from back reflecting off the endface surface towards the source.

The above analysis assumed that the tip of the fiber's cone face was centered along the central longitudinal axis of the core. However, the advantages of the cone-shaped face may also be utilized if the tip of the cone face is offset from the central longitudinal axis. FIG. 6 illustrates an example of one such optical fiber 29, with the tip 4 of the fiber offset from the center of the fiber.

In the preferred embodiment, the cone tip fibers are produced with standard fiber processing equipment adapted for the fabrication procedure. The fiber polishing equipment is preferably the variety with rotating abrasive disk platens. A holding mechanism, such as a collet, chuck, or similar device, is required to support and position the fiber for polishing. The holding mechanism must maintain the fiber's primary axis at the desired angle of polish relative to the rotating disk. Whereas conventional, flat-faced fiber polishing is accomplished by positioning the fiber's central axis at a 90° angle relative to the surface plane of the rotating disk, the pointed tip fibers of the present invention are formed by positioning the fiber at a lesser angle.

The holding mechanism also preferably includes a provision to simultaneously rotate the fiber about its major axis and sweep it back and forth across the abrasive disk. It is important for the holding mechanism to possess sufficient precision so the axis of rotation is accurately maintained with respect to the fiber's center longitudinal mechanical and optical axis.

To form the point on the fiber's endface, the fiber should be continuously rotated as it is swept back and forth across the polishing disk. Progressively finer polishing media are used to create a highly polished surface.

Depending on the desired optical effect, the tip of the pointed fiber may be further formed to create additional light-shaping characteristics. For example, the tip may be formed with compound angles or with a flat end so the endface is a frustum of a cone.

Figure 7:
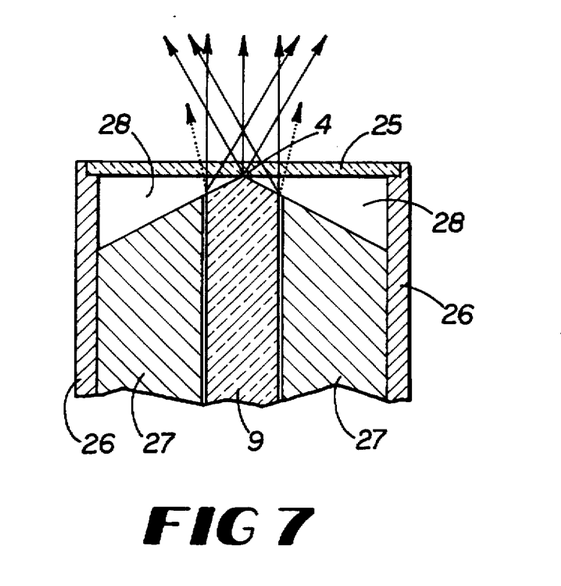
FIG. 7 is a plan section view of an optical fiber with a cone-shaped tip housed within a window assembly, and depicting the pattern of limiting light rays emerging from the cone-shaped tip as compared to the pattern of rays emerging from a flat-faced fiber.

As shown in FIG. 7, the optical fiber 9 may be housed within a window assembly, including a transparent window 25 displaced across the fiber tip 4 and a housing 26. The window 25, which is preferably made of sapphire or silica, protects the fiber tip 4 from being damaged by the environment in which it is being used. The fiber 9 is mounted within a termination ferrule 27, which is often referred to a fiber optic termination connector. The window 25 is connected to the fiber 9 by housing 26, typically a cylindrical metal tube, that is epoxied to termination ferrule 27 to secure the fiber in position. In addition to protecting the fiber, the window 25 provides the advantage of defining a closed chamber 28 between the inside of the window 25 and the optical fiber 9. By filling the chamber 28 with air or other gas having a known index of refraction, the behavior of light emerging from the fiber 9 can be more accurately predicted and controlled.

FIG. 7 also illustrates the pattern of light rays emerging (solid lines) emerging from the cone-shaped fiber 9. To demonstrate the physical (optical) effect of the cone-shaped endface, the pattern of light emerging from a conventional flat-faced optical fiber is shown in dashed lines.

In certain applications, a window 25 is placed in front of a source fiber adjacent to one or more receiving fibers. If the source fiber is a conventional flat-faced fiber, energy may be reflected off the window 25 and directed into the adjacent components. However, in the preferred embodiment, by angling the surface of the source fiber's cone, such that emerging rays are directed either converging or parallel to the fiber's center axis, back reflection from the window's surface 25 is directed back into the source fiber and thus prevented from interfering with adjacent components. Likewise, receiving fibers may be formed to reject luminous energy from adjacent source components.

As previously described, the cone-shaped tip controls light emergence and acceptance from the optical fiber. The effect is based on the polish angle of the cone tip and the refractive index change between the core and the media surrounding the fiber tip. For a typical application, the surrounding media may be air or similar gas (with a refractive index approximately equal to one). However, a substantial index change is achieved with a relatively high index media, such as liquids, by selecting fibers whose cores have high indices of refraction (such as sapphire or diamond) and/or steep cone angles.

It is also possible to use a cone-shaped fiber in conjunction with a conventional flat-faced fiber to achieve similar light control on any fiber. By this method, constraints placed on the shape of the distal tip are eliminated. Therefore, light control is achieved on fibers whose distal tips are flat. Further, by forming the distal tip as a complex surface such as angled planar, cone-shaped, spherical, cylindrical, etc., further control effects are realized. Constraints at the distal tip related to differing indices of refraction between the fiber core and the surrounding media are also relaxed or eliminated.

In other words, light control similar to that of a cone-shaped fiber tip surrounded by air may be achieved with any tip shape, in any medium by using an optical fiber assembly comprised of a section of optical fiber with a cone-shaped endface and an adjoining section of a flat-faced optical fiber.

Such an arrangement provides several advantages. For example, the resulting optical assembly does not have a fragile end-point that is susceptible to damage, thereby reducing the need for a window. Further, the optical assembly is not dependent on the change in refractive index between the fiber and surrounding media. The assembly can also be fabricated in a diametrically small package.

Figure 8:
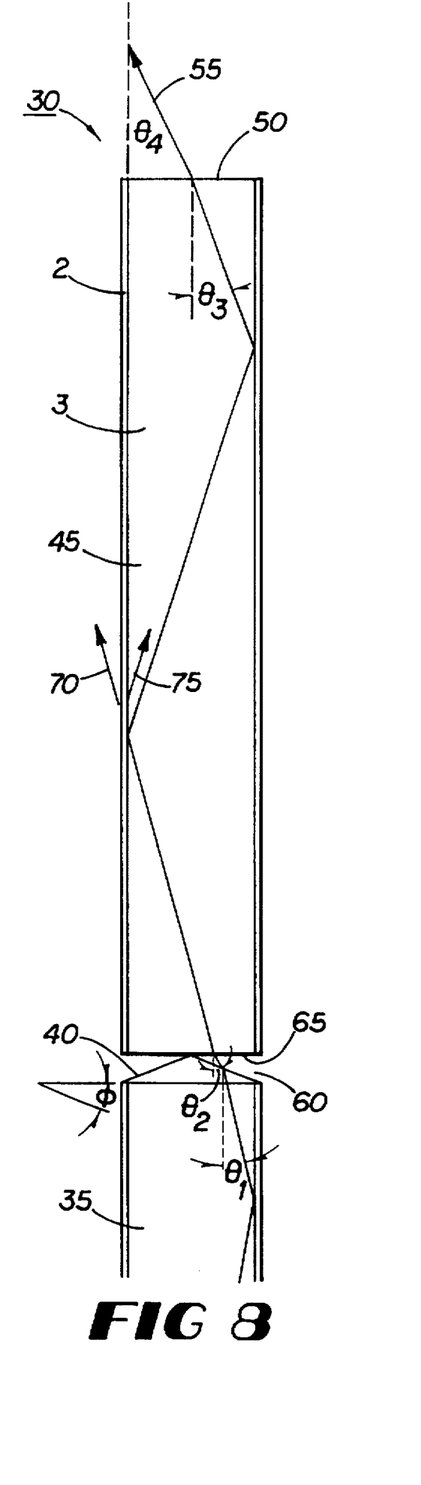
FIG. 8 is a side cross-sectional view of an optical assembly according to a preferred embodiment of the present invention, including an optical fiber having a cone-shaped endface that is coupled to a flat-faced optical fiber.

FIG. 8 illustrates one example of an optical assembly 30 having one optical fiber 35 having a cone-shaped endface 40 that is butted up to a second optical fiber 45. The distal end 50 of the second optical fiber 45 is generally flat-faced but may also be cone-shaped, plane-angled, spherically-shaped, mated surfaces, etc. Anti-reflective coatings can be applied to optical surfaces so as to maximize transmission.

The connection 60 between the first optical fiber 35 and the second optical fiber 45 is achieved with standard fiber optic mating connectors. Alternatively, miniature sleeves may be employed, such as capillary tubing and hypodermic tubing. Depending on the application, various couplers and industry-standard mechanical splices are suitable. These splices include those known in the industry such as elastomeric, capillary tubing, V-groove, etc.

Various materials (fluids, gels, epoxies, etc.) can be applied within the open space of the cone-faced fiber to flat-faced fiber junction 60. The refractive index of the material will determine light shaping characteristics. For media with higher indices of refraction than the core, the light bending will still follow the equation and the refraction will be opposite that observed for lower indices.

If the optical assembly 30 will be used in a manner such that the connection 60 will be subjected to rough handling or repeated connect/disconnect cycles, a special "stand off" can be permanently attached. Subsequent to forming the cone-shaped endface 40, a thin-walled, rigid tubular sleeve is positioned over the tip and epoxied in place. Although the sleeve end is typically precisely flush with the fiber face's cone tip so as to maximize power transfer, the tip may be recessed relative to the sleeve end. The sleeve facilitates precise positioning of the cone-shaped fiber tip 40 against the flat-faced fiber 45 or other surface. Mechanical stress on the cone tip 40 is minimized so as to prevent breakage and optical effects related to stress.

Two techniques are useful depending on the type of epoxy and desired end results. In the first method, the end of the sleeve should be cut or ground perpendicular with its lengthwise axis and free from burrs. The sleeve is inserted over the connector-mounted or bare fiber tip so that it is free to slide. The sleeve is temporarily moved up the fiber and away from the tip. The fiber is positioned perpendicular to a plate of glass, or other flat surface, by holding it from above. The fiber is lowered until the cone tip touches the glass plate or is positioned at the desired distance above it. When the desired position is achieved, the sleeve is permanently attached with epoxy or similar bonding agent. Care must be taken so as not to contaminate the endface with epoxy.

In the second method, the sleeve is permanently attached so it extends beyond the desired stand off length. The assembly is ground down with standard optical fiber polishing methods to the desired stand off distance (typically precisely flush). The fiber point may be coated with removable dye or similar material so as to provide a visual indicator as to when a flush polish is achieved.

For mating bundles of optical fibers, the individual fibers within the bundle may be aligned at the connection by starting with a bundle of fibers whose continuous length is the desired length of the overall assembly. The bundle is tightly constrained and epoxied/bonded in the region in which the connection is to be formed. Tubing is a suitable component to achieve this goal. Heat shrink tubing is desirable because of its ability to tightly constrain the fiber while allowing removal following epoxy cure and assembly. Rigid tubing such as metal, glass, or ceramic may also be used. Industry-standard connectors may also be suitable. The fact that this type of tubing is permanent may be a benefit or hindrance depending on the desired characteristics of the final assembly. If the connection location is far removed from the end, care must be taken so as not to damage the fibers as they are inserted into the tubing.

After the region is constrained and epoxied/bonded into a rigid section, a mechanical key or other identifying mark should be placed along the section parallel to the axis of the fiber. The section is then cut perpendicular to the fiber axis. The cut is best achieved with a thin precision saw such as a fine grain, diamond impregnated wheel. After processing and polishing each side of the cut to form the appropriate surfaces, the individual fibers are realigned by mating the two bundles together. This mating connection can be accomplished by any of the previously described methods for single fibers. Rotational alignment can be achieved by visually matching the previously described identifying marks or with the mechanical keys.

Referring to FIG. 8, the optical characteristics of the optical assembly 30 will be described. The following discussion assumes the perspective of an emerging ray 55 exiting the cone-shaped tip 40 and propagating through the second optical fiber 45. However, the analysis is equally valid for incoming rays and the correlation is readily drawn. As discussed above, the optical performance characteristics achieved related to ray acceptance patterns are particularly relevant in sensing applications. In the preferred embodiment, light acceptance (capture of incoming rays) is the primary intended mode of operation for the optical assembly 30. The following analysis ignores the near field effects at the cone-faced fiber to flat-faced fiber junction 60, which may cause the actual results to deviate slightly from theoretical predictions.

An arbitrary light ray 55 in a meridional plane propagates in the first (proximal) fiber section 35 towards the distal endface 50 of the second (distal) fiber section 45. The light ray 55 is incident upon the cone-shaped endface 40 at an angle $\theta_1$. The cone-shaped endface causes the ray to refract at angle $\theta_2$ as it propagates in the gap in the connection 60 between the first fiber 35 and the second (distal) fiber section 45, according to the previously described relationships. It propagates through the surrounding media at an angle $\theta_2$ until it is incident on the adjoining fiber face 65, where it is refracted to a new angle $\theta_3$.

The ray 55 propagates in the second fiber 45 at the new angle $\theta_3$ until it is incident on the core boundary. If the angle is beyond the fiber's critical angle for total internal reflection, a portion of the ray is transmitted into the media surrounding the core 3 (typically the cladding 2). The amount of loss is dependent upon the refractive index of the media and the angle of incidence. For angles slightly beyond the fiber's critical angle, the loss is typically insignificant for several reflections. For larger angles, the loss will be extreme.

A light ray 70 may escape the cladding 2 or the ray can be held within the bounds of the fiber by metallizing the fiber's surface for reflectivity. The metallization, such as aluminum or gold, can be applied to the core 3 or the outside cladding 2. For silica core/silica clad fiber, the metallization is applied directly to the fiber cladding 3 (the buffer or other coating (not shown) must first be removed). In this configuration, the portion of the ray escaping the core is refracted as it enters the cladding and is reflected by the metal so as to re-enter the core as a separate ray 75. Over long fiber lengths, the losses become severe due to reflection losses and propagation within the cladding section. Even highly reflective surfaces such as aluminum have less than 100% reflectively, and repeated reflections quickly attenuate the ray.

The ray 55 emerges from the fiber's distal face 50 and is refracted as it enters the surrounding media. It propagates in this medium at an angle $\theta_4$ influenced by the refractive index of the medium. For the same medium at the distal tip (equal refractive indices), as in a connection between a cone-shaped endface and a flat tip, the absolute value of the angle $\theta_4$ of final emergence equals the angle of the ray $\theta_2$ from the first cone-shaped endface (ignoring minor and long-term effects). The emergence angle is positive or negative according to the number of bounces during propagation.

Accordingly, when light is launched into the proximal section 35 and is propagating toward the cone-shaped tip 40, the special connection 60 fills the distal section 45 with higher order modes than are present in the proximal section 35.

This characteristic is useful for sources such as lasers which underfill fibers due to their highly directional characteristics. Thus the optical assembly 30 is utilized to create equilibrium modal distribution within an optical fiber. Fibers serving this purpose are generally referred to as 'launch or launching fibers'. Conventional launching fibers often have portions subjected to microbending stresses or wound in a tight bending loops. A launch fiber couples and conditions light from a source into an optical fiber. In this configuration, the proximal section will typically be short. The cone angle is minor so as not to overfill the distal section.

For illumination applications, the distal section 45 will typically be very short so as to minimize losses through the fiber sides. The distal section 45 will be overfilled with light rays whose angles of propagation are beyond the fiber's normal limits for total internal reflection. As a result, the exit cone of light emerging from the distal endface 50 diverges more rapidly than otherwise possible. Metallizing the distal section 45 tends to increase the percentage of light delivered through the distal endface 50. And, the metallization allows for steeper ray angles to be propagated, resulting in wider angles of beam divergence at the distal endface 50.

For certain applications, the characteristics of the overfilled rays to escape through the fiber side can be used to advantage. Thus, cylindrically emanating light is generated. The effect is heightened by redirecting or back reflecting the light at the distal endface 50 back toward the light source (not shown). In this case, a cone-shaped endface can be applied to the distal endface so that any rays reaching this endface are reflected back at an extreme angle to further encourage escape through the fiber's side walls.

By forming the cone on the end of the fiber such that the point is offset from the fiber's central axis, the illumination pattern emerging from the distal endface 50 is directed as required. Graphical ray analysis facilitates determining the appropriate geometry to achieve the desired illumination pattern. Factors affecting the illumination pattern include fiber diameter, propagation angles within the proximal section, cone angle, length of distal section, and refractive indices of materials involved. In the preferred embodiment, the distal section 55 is kept as short as possible so as to minimize mixing effects which tend to scramble the light and convolute the emerging illumination pattern.

The optical assembly 30 is also valuable in its ability to control receptivity of a fiber. Incoming rays which are normally lost through a fiber's side are directed to angles within the normal limits of propagation for total internal reflection. By keeping the distal section 45 short, the losses are minimized prior to refraction to angles within limits for normal propagation via total internal reflection. Thus, the acceptance cone of the fiber is broadened or directed as dictated by specific application requirements.

Analogous correlations are readily drawn between illumination and acceptance patterns. Illumination patterns are utilized in conjunction with ray analysis as a design aid to realize specific ray acceptance characteristics.

Optical filters such as band pass, high pass, low pass, and band stop filters can be applied in the connector 60 between the distal 45 and proximal 35 fiber sections. The filters can be wafers which are inserted into the junction or directly applied as coatings to the fiber faces. Care must be taken in applying interference filters as filter characteristics are related to ray angle through the filter. For best results, interference filters should be oriented with respect to the cone shaped endface 40 so that ray bending via refraction has already occurred. In other words, the ray angle should as close to normal (perpendicular) as possible to the filter surface. For example, when filtering received light propagating from the distal endface 50 toward the proximal end 65, the cone-shaped endface 40 is best formed on the distal section of fiber. It should be noted that this configuration can be used to filter while minimizing back reflection returning to the light source (not shown).

It is possible to employ other light shaping endfaces to achieve refraction in the connection between distal and proximal sections. For example, in place of a cone endface, a hyperbolic or spherical endface may be utilized to achieve desirable effects. However, the degree of light control and simplicity of construction may suffer by utilizing non-conical surfaces.

The present invention has been described in relation to particular embodiments which are intended in all respects to be illustrative rather than restrictive. Alternative embodiments will become apparent to those skilled in the art to which the present invention pertains without departing from its spirit and scope. For example, by utilizing two cone-shaped endfaces, one on the proximal and distal fibers, the refraction can be distributed between the two surfaces. Accordingly, the scope of the present invention is defined by the appended claims rather than the foregoing discussion.

What is claimed is:

1. An optical fiber comprising:
    a cylindrical core having a first refractive index, said core comprising a light conducting material;
    a cladding surrounding said cylindrical core, said cladding having a second refractive index lower than said first refractive index;
    said cylindrical core having an endface formed with a cone tip having a polish angle, said polish angle defined as the angle between the cone base and the cone side;
    said cone tip defining an acceptance angle for receiving light incident upon said endface;
    said polish angle selected to control said acceptance angle.

2. The optical fiber of claim 1, further comprising a window positioned across said cone tip, said window forming a chamber between the inside of said window and said cone tip.

3. The optical fiber of claim 2, wherein said chamber is filled with a gas having a known refractive index.

4. The optical fiber of claim 2, wherein said cone tip is formed to reject reflected energy from said window.

5. The optical fiber of claim 1, wherein said cone tip is formed with a flat end so that said endface is a frustum of a cone.

6. The optical fiber of claim 5, wherein said endface controls light by internal reflection at the inner walls of said frustum of said cone.

7. The optical fiber of claim 1, wherein said cladding is air.

8. The optical fiber of claim 1, wherein said cylindrical core defines a central longitudinal axis, and
    said cone tip is positioned centered about said central longitudinal axis.

9. The optical fiber of claim 1, wherein said cylindrical core defines a central longitudinal axis, and
    said cone tip is positioned off-centered from said central longitudinal axis.

10. The optical fiber of claim 1, wherein said cone tip is formed with compound angles.

11. The optical fiber of claim 1, wherein said optical fiber is a single mode fiber.

12. The optical fiber of claim 1, wherein said optical fiber is a gradient index fiber.

13. The optical fiber of claim 1, wherein said endface controls light by internal reflection.

14. The optical fiber of claim 1, wherein said endface controls light by refraction.

15. The optical fiber of claim 1, wherein said endface is housed in an open-ended sleeve with the distal surface of said sleeve extending at least even with the distal tip of said endface.

16. An optical fiber, comprising:
    a cylindrical core having a first refractive index, said core comprising a light conducting material;
    a cladding surrounding said cylindrical core, said cladding having a second refractive index lower than said first refractive index;
    said cylindrical core having an endface formed with a cone tip having a polish angle said polish angle defined as the angle between the cone base and the cone side;
    said cone tip defining an emergence angle for emitting light;
    said polish angle selected to control said emergence angle.

17. The optical fiber of claim 16, further comprising a window positioned across said cone tip, said window forming a chamber between the inside of said window and said cone tip.

18. The optical fiber of claim 17, wherein said chamber is filled with a gas having a known refractive index.

19. The optical fiber of claim 16, wherein said cone tip is formed with a flat end so that said endface is a frustum of a cone.

20. The optical fiber of claim 19, wherein said endface controls light by internal reflection at the inner walls of said frustum of said cone.

21. The optical fiber of claim 16, wherein said cladding is air.

22. The optical fiber of claim 16, wherein said cylindrical core defines a central longitudinal axis, and
    said cone tip is positioned centered about said central longitudinal axis.

23. The optical fiber of claim 16, wherein said cylindrical core defines a central longitudinal axis, and
    said cone tip is positioned off-centered from said central longitudinal axis.

24. The optical fiber of claim 16, wherein said cone tip is formed to prevent light energy from reflecting off said window toward a component adjacent to said optical fiber.

25. The optical fiber of claim 16, wherein said cone tip is formed with compound angles.

26. The optical fiber of claim 16, wherein said endface minimizes back propagation of outgoing light which has been back reflected from said endface.

27. The optical fiber of claim 16, wherein said optical fiber is a single mode fiber.

28. The optical fiber of claim 16, wherein said optical fiber is a gradient index fiber.

29. The optical fiber of claim 16, wherein said endface controls light by internal reflection.

30. The optical fiber of claim 16, wherein said endface controls light by refraction.

31. The optical fiber of claim 16, wherein said endface is housed in an open-ended sleeve with the distal surface of said sleeve extending at least even with the distal tip of said endface.

* * * * *

UNITED STATES PATENT AND TRADEMARK OFFICE
CERTIFICATE OF CORRECTION

PATENT NO. : 5,764,840

DATED : June 9, 1998

INVENTOR(S) : Wach

It is certified that error appears in the above-identified patent and that said Letters Patent is hereby corrected as shown below:

Col. 14, line 41, delete "16" and insert in place thereof --17--.

Signed and Sealed this

Twentieth Day of July, 1999

Attest:

Q. TODD DICKINSON

*Attesting Officer*  *Acting Commissioner of Patents and Trademarks*